Figure 1:
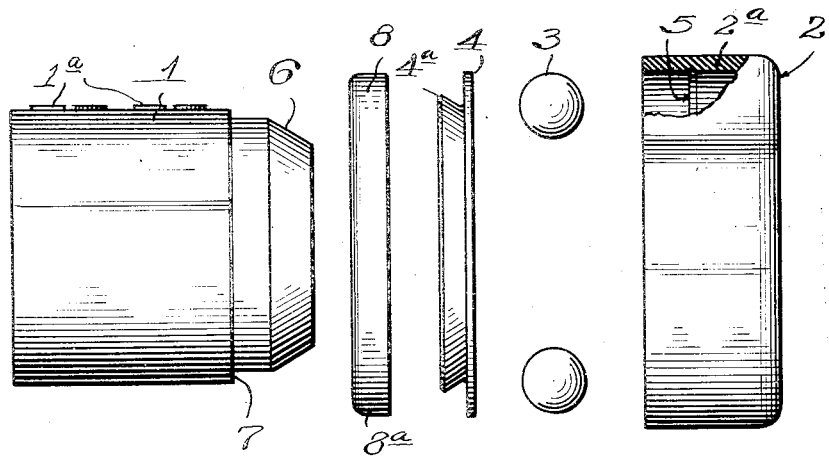

July 16, 1929.   A. W. SUNLEAF   1,720,703
BALL BEARING
Filed July 25, 1928

Inventor,
Arthur W. Sunleaf,

Patented July 16, 1929.

1,720,703

UNITED STATES PATENT OFFICE.

ARTHUR W. SUNLEAF, OF GENEVA, ILLINOIS, ASSIGNOR TO BURGESS-NORTON MFG. CO., OF GENEVA, ILLINOIS, A CORPORATION OF ILLINOIS.

BALL BEARING.

Application filed July 25, 1928. Serial No. 295,263.

This invention relates to improvements in ball bearings, and more particularly to a ball bearing assembly especially designed and constructed to be dust-proof and capable for use in various mechanisms for the antifrictional journalling of a shaft or other rotative part.

The object of the invention is to provide an inexpensive and dependable bearing unit readily assembled and installed, and so designed as to exclude dust and dirt.

An example of a use for which such a bearing is adapted, would be in lawn-mowers as well as other domestic appliances, although for the purpose of this disclosure only the bearing assembly will be shown.

Figure 2:
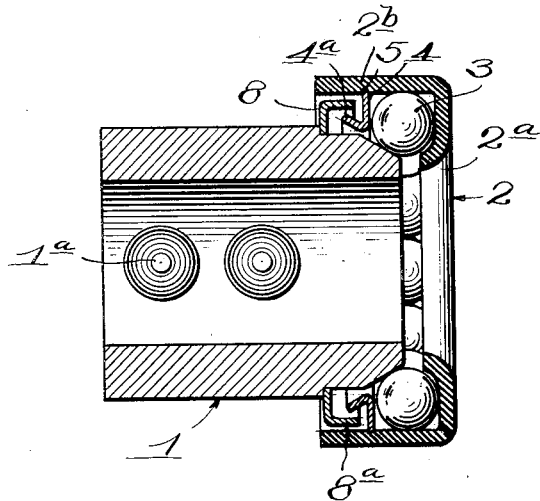

In the drawings,

Figure 1 is a view in elevation of the several parts of the bearing separated, and Figure 2 is a view in cross-section of the assembled bearing.

The main parts of the bearing assembly comprise a sleeve or bushing 1, which in practice would be mounted at the end of the shaft to be journalled. and a cup-shaped bearing ring or cage 2, which would be held stationary in a suitable journal support or bracket. Thus the bushing 1 may be considered as the rotative member and the cage 2 as the fixed member. The bushing is provided with one or more set-screws 1ª for securing the same to the shaft or other member with which it rotates.

The bearing ring 2 is a cup-shaped member, preferably stamped from sheet metal, having a central aperture with the edges of the metal turned inwardly in a curved flange 2ª. The outer edge of the ring has the form of a concentric flange 2ᵇ, having a diameter considerably greater than that of the bushing 1, and extending at right angles to the face of the ring, a distance to surround the end of the bushing. The radial distance between the outer flange 2ᵇ and inner curved flange 2ª of the ring is such as to provide an annular race for a series of ball bearings 3 which are free to roll in a circular path in the usual manner. These ball bearings are held against displacement in the race by means of a retaining ring 4 consisting of a thin metal ring having slightly larger diameter than the internal diameter of the flange 2ᵇ of the bearing ring 2. As a preferable construction, a shallow slot 5 is cut in the internal surface of the flange 2ᵇ inwardly from its outer edge, thereby providing a seat for the retaining ring 4 so positioned that there will be a small clearance between the retaining ring and the bearing balls. The retaining ring is forced into the bearing ring by the application of pressure about the marginal portion of the ring in such a manner that it is upset sufficiently to enter the bearing ring and seat in the slot 5, whereupon it resumes or springs back into its normal contour, thus completing the cage assembly. At the inner edge of the retaining ring is a flange 4ª extending axially with a slight radial flare toward the bushing 1, that is, toward the open side of the bearing ring 2.

The bushing 1 is a sleeve-like member, having at its forward end a beveled bearing face 6 adapted to contact with the bearing balls 3 through the slot formed between the inner edge of the retaining ring 4, and the edge of the inner flange 2ª of the bearing ring. This beveled face is preferably ground smoothly to provide a free running surface. Immediately beyond the beveled face 6, the bushing is reduced to form a shoulder 7. Fitting onto the bushing from the beveled end is a dust ring 8 of an external diameter substantially equal to the internal diameter of the bearing ring 2 to telescope into it with a slight clearance between, its position on the bushing 1 being such that it lies in the plane of the edge of the flange 2ᵇ of the bearing ring. The dust ring 8 is also provided with an annular flange 8ª about its outer edge, which projects inwardly into the annular slot formed between the flange 2ᵇ of the bearing ring and the flanged retaining ring 4.

In assembling the parts, the bearing ring 2 with its balls 3ª and retaining ring form one complete unit, and the bushing 1 with the dust ring 8 form the other unit. These units may then be readily mounted in or on their respective parts, and in the final assembly the beveled end of the bushing is inserted into the bearing ring in contact with the bearing balls. When thus assembled the flange of the retaining ring surrounds the bushing 1 just beyond the beveled face 6, and the flanged dust ring 8 interlocks so to speak, with the retaining ring, thereby providing a simple yet effective means for excluding dirt from the ball race.

Having set forth a preferred embodiment of my invention,

I claim:

A bearing comprising a bearing cage consisting of a cup-shaped member forming a ball race, bearing balls in said race, a retaining ring fitting into said cage and provided with a marginal flange projecting outwardly from said ball race, a bushing having a beveled face at one end adapted for contact with said balls, and a dust ring mounted on said bushing adjacent said beveled face and having a flanged edge projecting inwardly in overlapping relation with the flange of said retaining ring.

Signed at Geneva, Illinois, this 29th day of June, 1928.

ARTHUR W. SUNLEAF.